United States Patent [19]

Curasi

[11] 4,320,671
[45] Mar. 23, 1982

[54] CRANKSHAFT COUNTERBALANCING

[76] Inventor: Robert R. Curasi, 4104 Ash St., Dunsmuir, Calif. 96025

[21] Appl. No.: 144,653

[22] Filed: Apr. 28, 1980

Related U.S. Application Data

[63] Continuation-in-part of Ser. No. 909,365, May 25, 1978, abandoned.

[51] Int. Cl.³ .............................................. F16C 3/04
[52] U.S. Cl. .................................. 74/604; 123/192 B
[58] Field of Search .................. 74/603, 604, 52, 591; 123/192 B

[56] References Cited

U.S. PATENT DOCUMENTS

| | | | |
|---|---|---|---|
| 642,761 | 2/1900 | Smith | 74/604 |
| 1,326,129 | 12/1919 | Chadbovrne | 74/52 |
| 1,785,338 | 12/1930 | Coleman | 74/604 |
| 2,407,102 | 9/1946 | Ryder | 74/604 |

FOREIGN PATENT DOCUMENTS 819193 10/1937 France .................................. 74/604

*Primary Examiner*—Kenneth Dorner
*Attorney, Agent, or Firm*—Herzig & Walsh, Inc.

[57] ABSTRACT

Mechanism for counterbalancing a crankshaft, connecting rod and piston assembly. Carried by the shaft are the typical or conventional counterbalancing mass means. The invention provides additional counterbalancing mass means which are rotatable relative to the shaft and relative to the regular counterbalancing means in a manner to counterbalance through 360°. The additional counterbalancing means are driven by a gear means coaxial with the shaft and additional driving planetary gear means mounted on a shaft which planetates, the planetary gear means not rotating about their axes. The additional counterbalancing mass means are driven at a speed twice that of the regular counterbalancing masses. The conventional counterbalancing masses and the additional counterbalancing masses take relative positions throughout the 360° to counterbalance at all positions.

9 Claims, 7 Drawing Figures

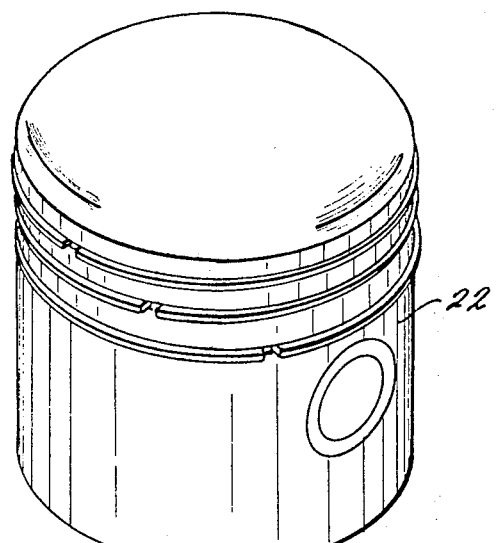
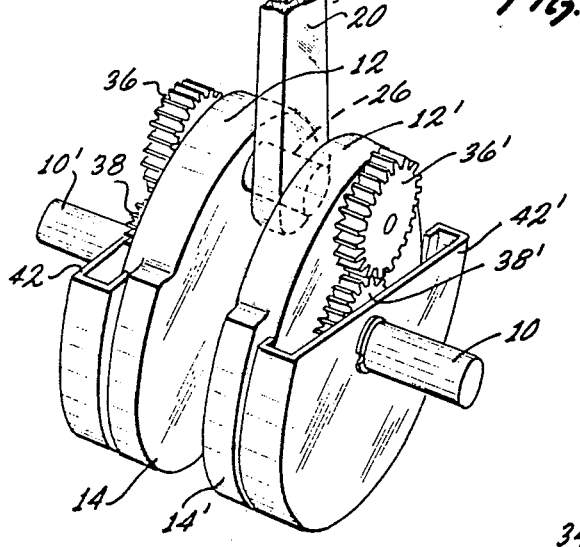
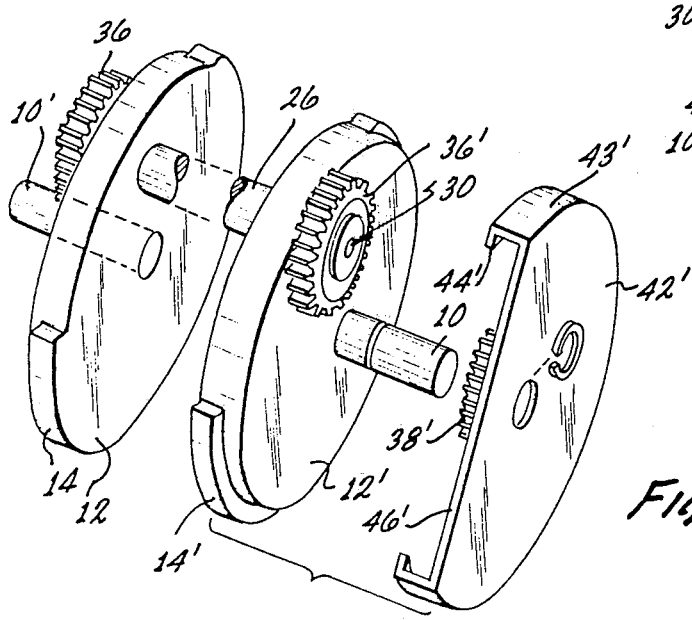
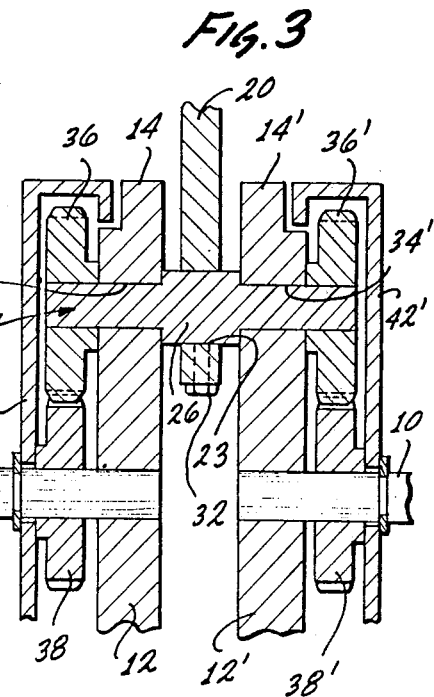

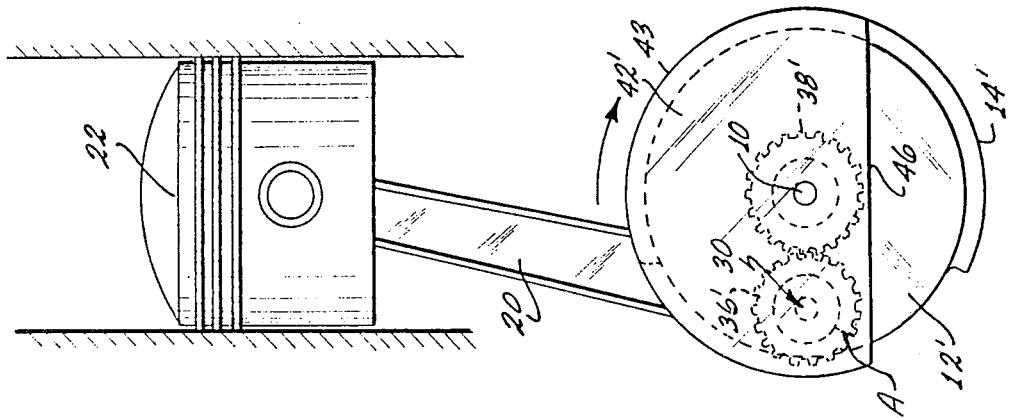
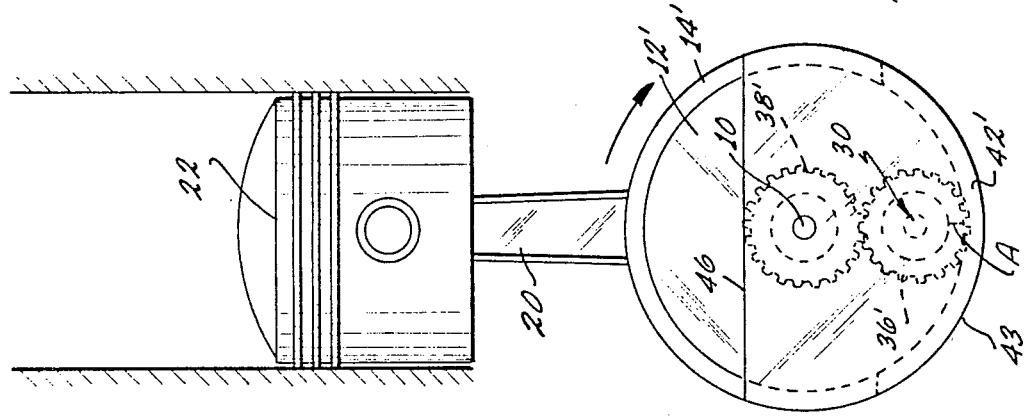
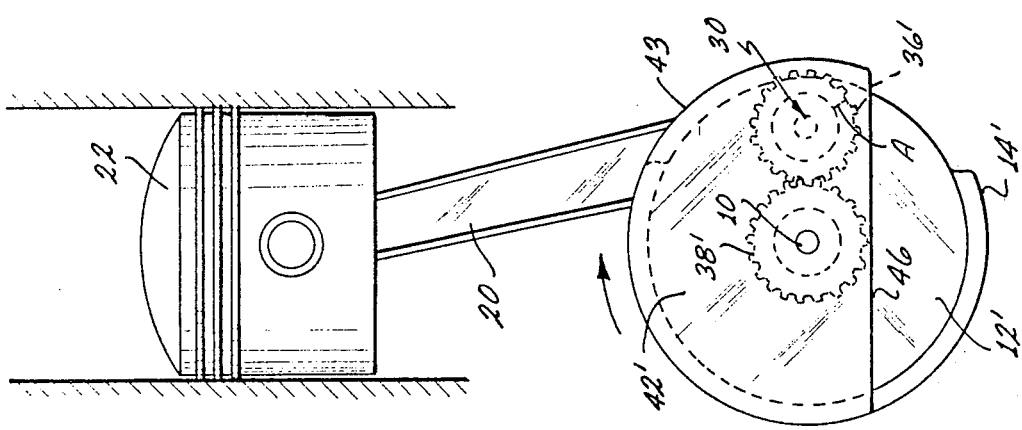
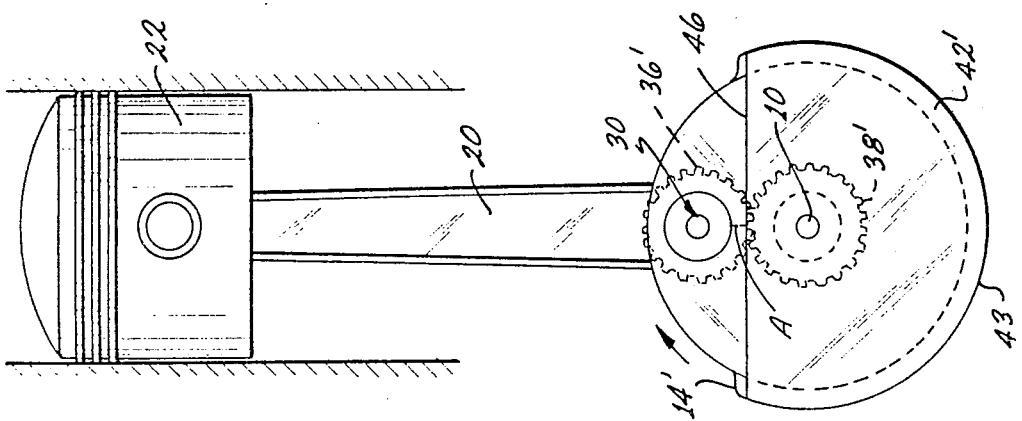

CRANKSHAFT COUNTERBALANCING

This application is a continuation-in-part of application Ser. No. 909,365, now abandoned, filed May 25, 1978.

BACKGROUND OF THE INVENTION

1. Field of the Invention

The field of the invention is that of counterbalancing mechanisms wherein a crankshaft has connection to a reciprocating mass. This assembly appears particularly in internal combustion engines and the preferred form of the invention as described in detail herein is adapted for utilization in an internal combustion engine. Typically in mechanisms of the type referred to, very large unbalanced forces are present which are a source of vibration. It is in this area or field of counterbalancing and eliminating or avoid vibration that the invention resides.

2. Description of the Prior Art

With respect to the prior art, reference is also made to the volume entitled "A Study of the 4-Stroke Motorcycle Engine" published by the Bagnall Publishing Company, Box 638, Sierra Madre, Calif. 91024. Reference is made particularly to pages 35, 36, 37, 38 and 39 of this publication which explains crankshaft balancing and vibratory forces that are induced. This publication notes how in the typical reciprocating engine with a counterbalanced crankshaft, there is only a possibility of fifty percent (50%) balance. The term "BALANCE FACTOR" is also defined and explained. These pages of the publication are hereby incorporated herein by reference and copies are attached hereto.

SUMMARY OF THE INVENTION

The preferred exemplary form of the invention as described in detail herein is adapted in an internal combustion engine. The engine has a crankshaft having a crank including a pair of rotors which carry the typical counterbalancing masses. The crankpin is positioned between the two rotors carrying the counterbalancing masses. Another pair of counterbalancing masses is provided and mounted to rotate about the shaft. Attached to these masses are drive gears which are rotatable relative to the crankshaft. The connecting rod connects to the crankpin and on the crankshaft are planetary gears that mesh with the drive gears for the additional counterbalancing masses. The planetary gears planetate but do not rotate about their own axes so that they drive the drive gears that rotate the additional counterbalancing masses. The relationship is such that the additional counterbalancing masses rotate at twice the speed of the shaft in the same direction with the result that in any rotated position, the angular relationship of the additional counterbalancing masses relative to the reciprocating parts is such that counterbalancing is achieved, through 360°.

In the light of the foregoing, the primary object of the invention is to provide mechanisms whereby to achieve counterbalancing through 360° in machines wherein a crankshaft is connected to a reciprocating part such as in an internal combustion engine.

A further object is to provide a mechanism for achieving the foregoing purpose in the form of an additional rotating counterbalance mass or masses which is rotated relatively with respect to the normal counterbalancing masses and the shaft, thereby to achieve counterbalancing in all angular positions of the shaft.

A further object is to provide the capability of achieving the foregoing purposes, by way of an additional counterbalancing mass or masses driven by a planetary gear or gears coaxial with the crankpin whereby to drive other gears and the additional counterbalancing mass or masses during planetation.

Further objects and additional advantages of the invention will become apparent from the following detailed description and annexed drawings wherein:

FIG. 1 is a schematic isometric view of an exemplary form of the invention, connected to a reciprocating piston.

FIG. 2 is a partial exploded view of the mechanism of FIG. 1.

FIG. 3 is a cross-sectional view through the crankpin of FIGS. 1 and 2.

FIGS. 4, 5, 6 and 7 are diagrammatic views illustrating the relative rotation of the additional counterbalancing masses, and the manner in which one hundred percent (100%) counterbalancing is achieved.

DESCRIPTION OF THE PREFERRED EMBODIMENT

Referring now more in detail to the various Figures of the drawings, numeral 10-10' illustrates a typical crankshaft. Mounted on the crankshaft are discs or rotors 12 and 12' which have parts 14 and 14' which are of larger diameter and of sufficient mass to serve as counterbalancing masses such as are typically found associated with crankshafts. The parts 14-14' of larger diameter may extend through 180° or more than 180°.

Numeral 20 designates diagrammatically a connecting rod which in an internal combustion engine is connected to a wrist pin in a reciprocating piston as shown at 22.

In the connecting rod 20 is an opening 23 and it is mounted on enlarged part 26 of crankpin 30. See FIG. 3. Connecting rod 20 is secured to the crankpin 30 by means of a set screw 32, as may be seen in FIG. 3. The crankpin 30 extends through bores 34 and 34' respectively in the rotors 12 and 12', as may be seen in FIG. 3. The set screw 32 engages the crankpin or shaft 30 and it does not rotate about its own axis relative to the connecting rod 20. Mounted at the ends of the crankpin shaft 30 are planetary gears 36 and 36'. These gears are fixed on the crankpin shaft 30.

Rotatably mounted on the crankshaft 10-10' are gears 38 and 38' which mesh with gears 36 and 36'.

Numerals 42 and 42' designate a pair of additonal rotary counterbalancing masses which are journalled on shaft 10-10' and are driven by the gears 36 and 36'. These masses are substantially semicircular; they may have a circumferential extent of 180° or slightly more in their configuration and shape, as may be seen in the figures. In the construction shown, referring to the counterbalancing mass 42' there is a peripheral flange or rim 43', at one side of which has an inwardly turned flange 44'. The angular extent shown is greater than 180°, the circular part being terminated by the flat side as designated at 46'. The gears 38 and 38' and the additional counterbalancing masses 42 and 42' are mounted or positioned adjacent to the outside surfaces of the rotors 12 and 12' as shown. During part of the rotary movement of the additional masses, the gears are enclosed between the rotors 12 and 12' and the additional counterbalancing masses 42 and 42' as may be more clearly seen in FIGS. 4–7. The counterbalancing mass 42 is like the mass 42'.

OPERATION

From the foregoing, those skilled in the art will readily understand the construction of the mechanism and the ensuing description of its operation and capabilities. With respect to background in the art, reference should be had to the publication referred to, that is, FIGS. 35–39 and the diagrams therein which illustrate how typical counterbalancing in an internal combustion engine is capable of only fifty percent (50%) balancing. Base phase positions can be considered; (i.e.) when the regular or normal counterbalancing weights are aligned with the piston and connecting rod by an amount of 90°. The typical set-up is arranged to provide one hundred percent (100%) counterbalancing in the basic phase positions, and in between and to achieve a favorable or optimum balance factor.

As pointed out, the herein invention provides counterbalancing throughout 360°, this being illustrated in FIGS. 4–7. In the construction shown, each time the planetary gears 36-36' planetate through one revolution by reason of their meshing with gears 38 and 38', these gears and the additional counterbalancing masses 42-42' are driven through two revolutions. This is illustrated in FIGS. 4–7.

In the adaptation of the invention in an internal combustion engine, the piston is directly above the rotating members as shown in FIGS. 4–7. As may be observed, the planetary gear 36' in moving from the position of FIG. 4 to that of FIG. 6 has moved through substantially 180° which has caused counterbalancing mass 42' to move through 360°. As the gear 36' continues to planetate, as illustrated in FIG. 7, and FIG. 1 upon its having moved through 360°, the counterbalancing mass 42' will have moved through two complete revolutions.

Thus, it can be seen that whereas with only the normal or regular counterbalancing masses, only fifty percent (50%) counterbalancing can be achieved, with the herein invention counterbalancing is achieved through 360°. This can be observed from the angular phase relationship between the additional counterbalancing masses and the regular counterbalancing masses. Having in mind the phase positions referred to above, as reference points, it can be seen that in the positions of the figures, the additional counterbalancing masses have a relative angular orientation with respect to the regular counterbalancing masses as to fully counterbalance. In the 90° positions, it may be seen that the phase relationship as between the additional counterbalancing masses and the regular counterbalancing masses is that they are 90° apart whereby the complete counterbalancing is achieved.

The counterbalancing can be described more specifically in the terms of the twelve o'clock, three o'clock, six o'clock and nine o'clock crank positions of FIGS. 4, 5, 6 and 7 respectfully. In FIG. 4, the twelve o'clock position (top dead center) both the regular counterbalancing masses and the additional counterbalancing masses are directly opposite the piston 22 for complete balancing at that position.

This can be readily understood from an inspection of FIGS. 4, 5, 6 and 7 by referring to the index marker A on the gear 36'. It is to be seen as this gear planetates through an orbit the index marker A stays aligned with the connecting rod 20 because the gear 36' is fixed on the shaft 30. As the gear 36' planetates, of course, it pulls the gear 38' around with it so that as it pulls it around when gear 36' goes through one orbit it pulls it around through one revolution. However, there is an effective relative rotation as between gear 36' and gear 38'. This can be seen from the relative positions of the index marker A on the gear 36' in the FIGS. 4–7. As can be seen from the figures, during one orbit of the gear 36' the index marker A has gone through one revolution relative to the gear 38' and thus, has imparted an additional revolution to the gear 38' about its axis in the same direction. Thus, it is readily seen that the counterbalancing mass 42' moves through two revolutions while the mass 12' goes through a single revolution.

In FIG. 5 the normal or regular counterbalancing masses are in a nine o'clock position so as to counterbalance the crankpin, planetary gears, and part of the connecting rod. The additional counterbalancing masses have rotated through 180° so they are in the twelve o'clock position to counterbalance the piston 22, which is in mid position of travel.

In FIG. 6 which is the six o'clock position, (bottom dead center) the regular counterbalancing masses are in the twelve o'clock position and the additional counterbalancing masses are in the six o'clock position so as to product complete balancing.

In FIG. 7 which is the nine o'clock position, the regular counterbalancing masses are in the three o'clock position to balance the crankpin, planetary gears and a part of the connecting rod. The additional counterbalancing masses are in the twelve o'clock position to balance the piston 22.

As may be observed from the description of the four quadrant positions there is full balancing at each and then there is full balancing in between the quadrant positions.

From the foregoing, those skilled in the art will readily understand the nature and construction of the invention and the manner in which it achieves all of the objectives set forth in the foregoing.

The foregoing disclosure is representative of a preferred form of the invention and is to be interpreted in an illustrative rather than a limiting sense, the invention to be accorded the full scope of the claims appended hereto.

I claim:

1. In mechanism including a shaft, a cylinder having an axis, a reciprocating piston, connecting rod and crankpin means for driving the shaft, the crankpin means having top dead center and bottom dead center positions with respect to said axis, means for counterbalancing through 360° including said mechanism having a first conventional counterbalancing mass means rotatable around the shaft, which align with the connecting rod and said axis at bottom dead center and at top dead center positions, second counterbalancing mass means, drive means whereby the second counterbalancing mass means is rotated about the axis of the shaft, said drive means being constructed to rotate the said second counterbalancing mass means relatively so that at both top dead center and bottom dead center positions of the crank pin means the second counterbalancing means are at bottom dead center position.

2. A mechanism as in claim 1 wherein at top dead center position of the crankpin means, the first counterbalancing mass means are at bottom dead center position, and the second counterbalancing mass means are at bottom dead center position.

3. A mechanism as in claim 2 wherein at the 90° crank position of clockwise rotation from top dead center position (0° position) of the crankpin means the first mass means are in the 270° clockwise position and the second counterbalancing mass means are at the top dead center position; and at the clockwise 270° degree crank position of the crankpin means the first counterbalancing masses are at the 90° position and the second counterbalancing mass means are at the 0° position.

4. A mechanism as in claim 1 wherein the drive means for the second counterbalancing mass means includes planetary gear means carried by the first counterbalancing mass means, gear means driving the second counterbalancing mass means meshing with the planetary gear means whereby the second counterbalancing gear means are driven in a direction the same as the first counterbalancing means.

5. A construction as in claim 4, wherein said planetary gear means are held from rotation about the axis of the planetary gear means.

6. A construction as in claim 4, wherein said gear means are constructed to drive the additional counterbalancing means at twice the speed of the said shaft.

7. A construction as in claim 4, including a shaft on which the planetary gear means are mounted, the connecting rod means being connected to the last said shaft, and the said gear means driving the second counterbalancing means being fixed on the first said shaft.

8. A construction as in claim 4, wherein said first counterbalancing mass means comprises a pair of similar members, the additional counterbalancing mass means comprises a pair of similar members, said drive gear means comprising a pair of gears associated with the additional counterbalancing means and said planetary gear means comprising a pair of gears meshing with the gears associated with the additional counterbalancing mass means.

9. In mechanism including a shaft, a cylinder having an axis, a reciprocating piston, connecting rod and crankpin means for driving the shaft, the crankpin means having top dead center and bottom dead center positions, means for counterbalancing through 360° including said mechanism having a first conventional counterbalancing mass means rotatable around the shaft, which align with the connecting rod and said axis at bottom dead center and at top dead center positions, second counterbalancing means, drive means whereby the second counterbalancing mass means is rotated about the axis of the shaft, said drive means being constructed to rotate the second counterbalancing mass means, the first and second counterbalancing mass means being angularly related whereby in both the top dead center and bottom dead center positions of the crankpin means the second counterbalancing mass means are at the bottom dead center position.

* * * * *